April 19, 1960
R. S. KRAVIG ET AL
2,933,223
DECORATIVE BOWS AND METHOD AND MACHINE
FOR FABRICATING THE SAME
Filed July 23, 1958
4 Sheets-Sheet 1
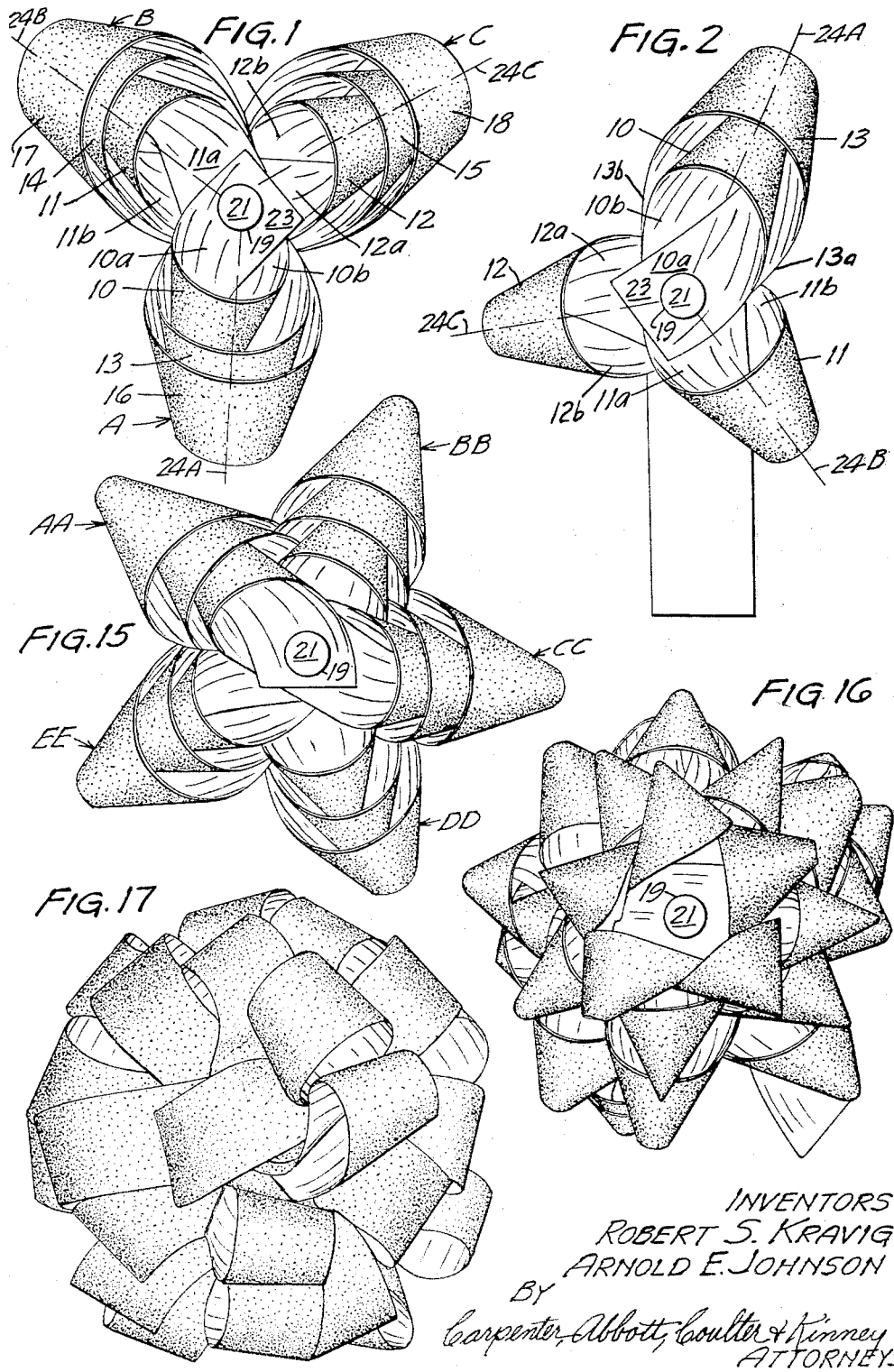
INVENTORS
ROBERT S. KRAVIG
ARNOLD E. JOHNSON
BY
Carpenter, Abbott, Coulter & Kinney
ATTORNEYS April 19, 1960
R. S. KRAVIG ET AL
2,933,223
DECORATIVE BOWS AND METHOD AND MACHINE
FOR FABRICATING THE SAME
Filed July 23, 1958
4 Sheets-Sheet 2
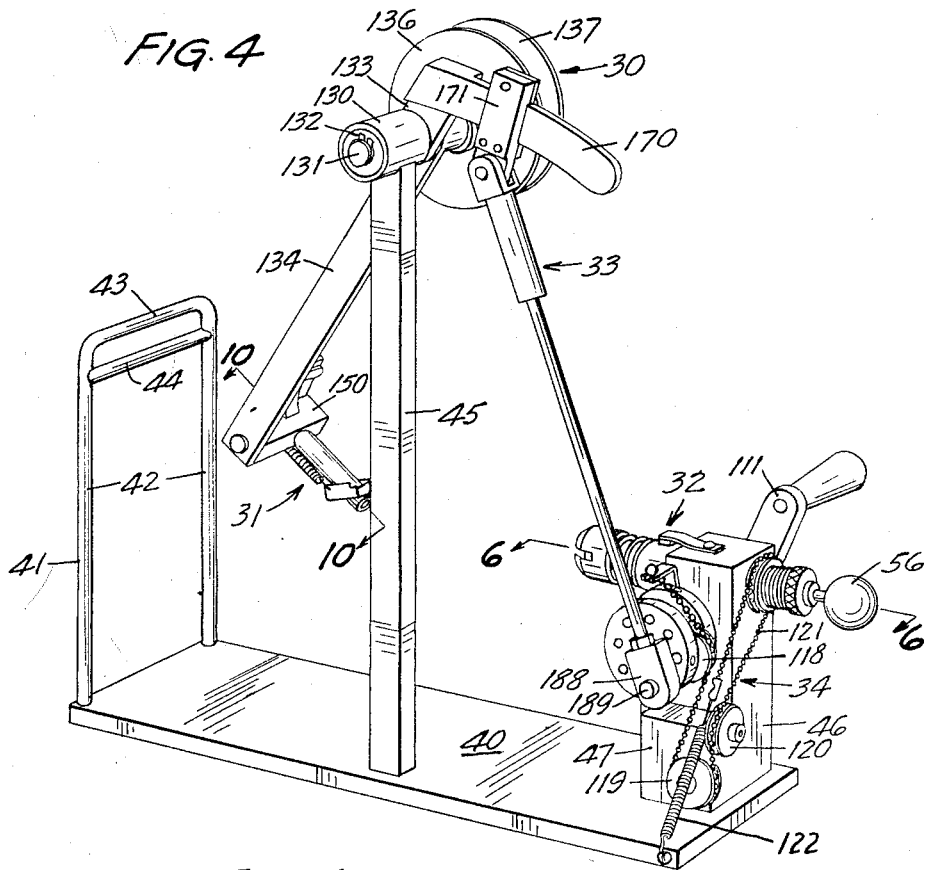
FIG. 4
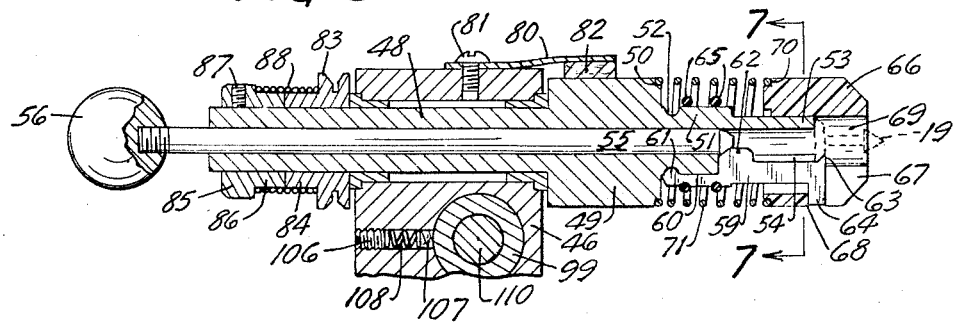
FIG. 6
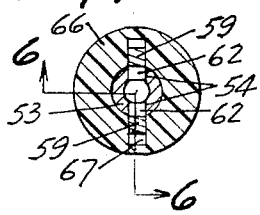
FIG. 7
FIG. 3
INVENTORS
ROBERT S. KRAVIG
ARNOLD E. JOHNSON
BY
Carpenter, Abbott, Coulter & Kinney
ATTORNEYS

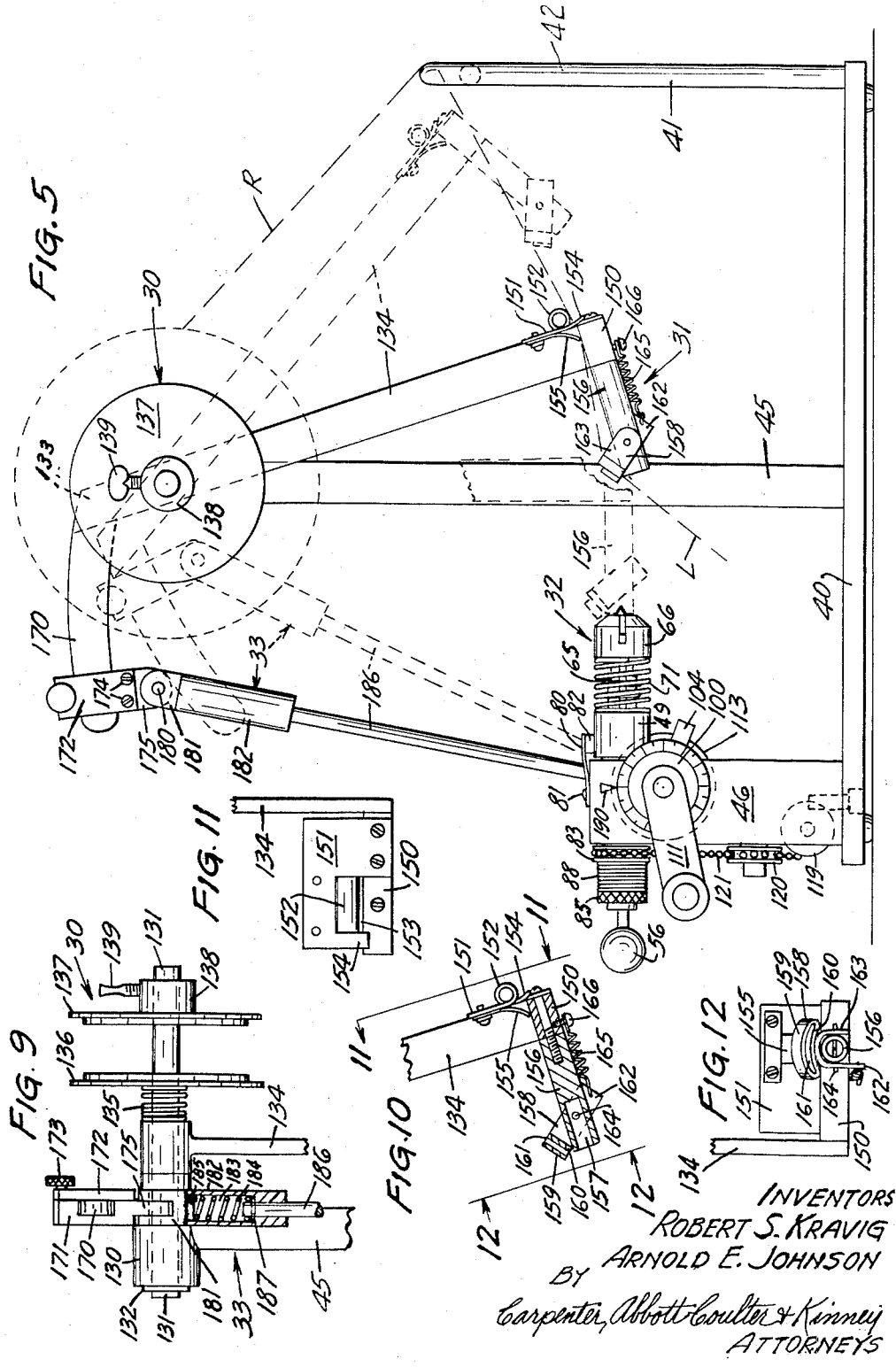

April 19, 1960
R. S. KRAVIG ET AL
2,933,223
DECORATIVE BOWS AND METHOD AND MACHINE
FOR FABRICATING THE SAME
Filed July 23, 1958
4 Sheets-Sheet 4
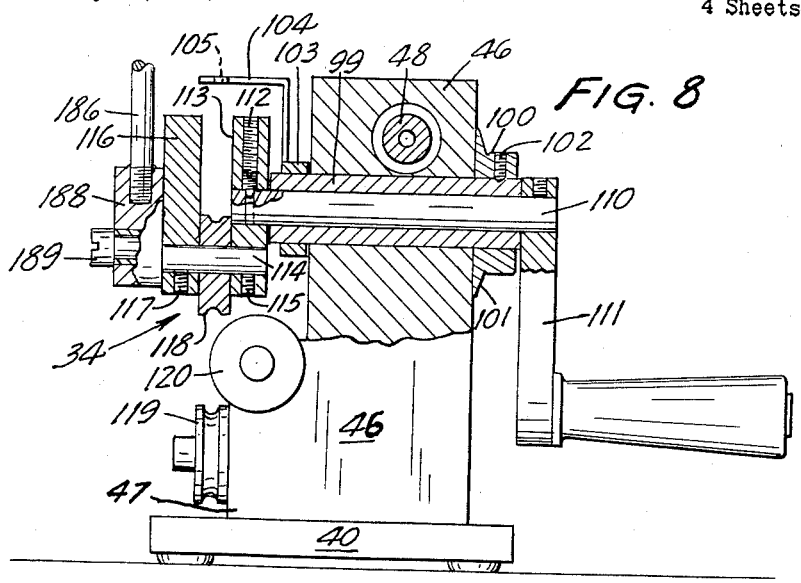
FIG. 8
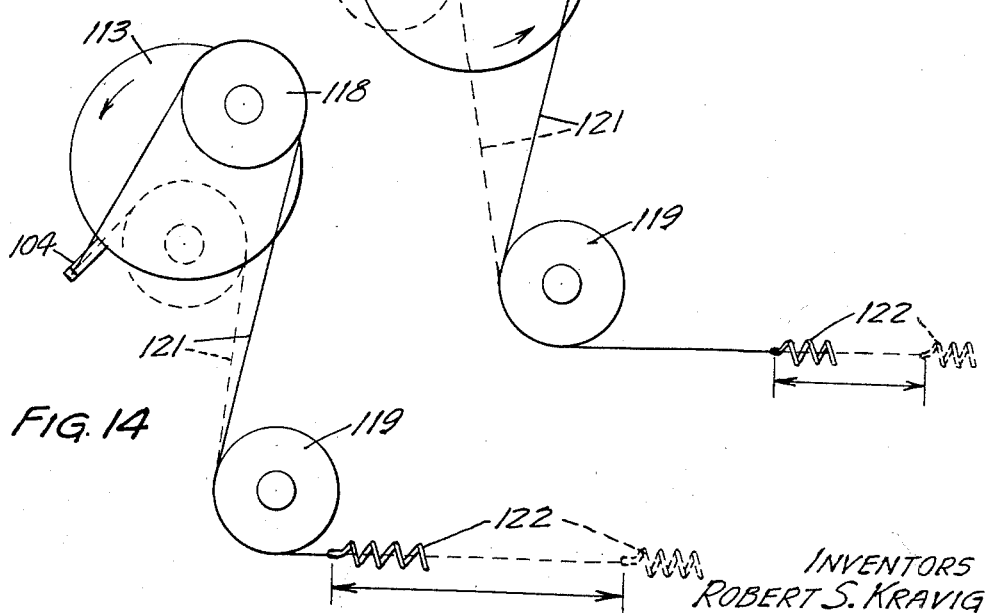
FIG. 13
FIG. 14
INVENTORS
ROBERT S. KRAVIG
ARNOLD E. JOHNSON
BY Carpenter, Abbott, Coulter, Kinney
ATTORNEYS

United States Patent Office 2,933,223
Patented Apr. 19, 1960

2,933,223

DECORATIVE BOWS AND METHOD AND MACHINE FOR FABRICATING THE SAME

Robert S. Kravig, Bloomington, and Arnold E. Johnson, Maplewood, Minn., assignors to Minnesota Mining and Manufacturing Company, St. Paul, Minn., a corporation of Delaware Application July 23, 1958, Serial No. 750,396

20 Claims. (Cl. 223—46)

The present invention relates to the art of decorating such things as gift packages, displays, tables, holiday scenes, and the like with decorative bow structures. More particularly, this invention is directed to the provision of novel decorative bow structures formed of strip material such as decorative ribbon; to methods of making such bow structures from continuous lengths of strip material; and to the provision of novel bow fabricating machines for rapidly forming decorative bow structures virtually in their completed state.

The preparation of fancy, attractive displays, holiday decorations, and particularly gift packages using decorative ribbons and papers has become a highly commercialized business. Manufacturers of decorative ribbons and decorative wrapping papers and such like have vigorously promoted the use of their commodities in the preparation of attractively wrapped packages. Many industrial concerns, for example department stores and novelty shops, have organized separate departments almost exclusively engaged in gift wrapping commodities purchased elsewhere in their stores. Particularly around holiday times, these departments gift wrap large numbers of packages every working day. Others have made a business of fabricating decorative bow structures in mass quantities for sale to the home users, so that the latter can wrap their own gifts and packages, and formulate their own decorative displays without having to tie or fabricate decorative bows themselves.

Still other concerns, as part of promotional endeavors, have utilized decorative ribbon products in the commercialization of their products. For example, during the various holiday seasons distilleries and other vendors of beverage goods often sell their bottled products fancily wrapped in packages employing ornamental decorative ribbon bows, the object being that the product can be given by the purchaser to another as a gift without any further ornamental or decorative wrapping being necessary. Promotional advertising of such concerns in magazines, newspapers, etc., emphasizes the attractively packaged goods in an effort thereby to induce sales to those buying the products specifically as gifts for others.

Such wide and increasing commercial usage of decorative ribbon products requires that ribbon products be susceptible of production in large quantities in a relatively short time. The fewer manual operations involved the better. However, in order to be sufficiently pleasing and unique so that the purchasing public is willing to use the bow products on personal gifts and packages, the bows must be individualistic in appearance. That is, they should not be stereotyped or non-personal. Ordinarily mass production, on the one hand, and the provision of attractive, unique, individualistic and artistic appearing bow products, on the other, are antagonistic desires. The present invention is especially concerned with the mutual satisfaction of these wants.

Various literature articles and patents have issued from time to time over recent years relating to the provision of decorative structures and to machines and devices for making the same. The ornamental pompon or puff bow, fashioned from many loops of ribbon to resemble a tufted ball, has become quite popular. This popularity is due in large part to the ease and speed with which pompon bows can be formed from a prefabricated hank of decorative ribbon, all in accordance with McMahan Reissue Patent No. 23,835, granted June 8, 1954. Machines by which the prefabricated hanks of ribbon can be manufactured rapidly and in large numbers are disclosed and claimed in Duncan Patent No. 2,872,086, granted February 3, 1959, on application Ser. No. 526,856, copending herewith, as a continuation-in-part of Duncan application Ser. No. 366,844, filed July 8, 1953, now abandoned. Although the ornamental pompon bows formed in accordance with the aforesaid McMahon and Duncan patents have satisfied a very real need in that they are one of the very first types of bows consisting of many radiating loops of ribbon to be manufactured even partly in mass production, nevertheless very substantial manual operations, i.e., the forming of the bow from the prefabricated hank of ribbon, are involved in their manufacture. However, it is desirable that as many manual operations as possible be eliminated from operations wherein large numbers of completed bows are manufactured.

Others have concerned themselves with the fabrication of decorative bows from lengths of strip material. James Patent No. 2,681,525, granted June 22, 1954 discloses bows formed from continuous lengths of strip material preformed to a desired shape or perforated condition. However, such bows as are disclosed in said James patent, as a practical matter, are required to be formed by hand procedures and are not susceptible of production in large quantities. Moreover those bows disclosed wherein loops radiate in many directions from the bow center are so formed that some loops have one surface of the ribbon exposed outwardly, and the remaining loops have the opposite ribbon surface exposed outwardly. Such bows thus are not advantageously formed of commercially available decorative ribbons wherein one surface, i.e., the face surface, is provided with a high sheen and the opposite or back surface has a rather dull finish. Bows made from commercial ribbons of this type contain many dull appearing loops randomly interspersed with loops wherein the face surface of high sheen is exposed.

James Patent No. 2,774,164, granted December 18, 1956, as a continuation-in-part of the aforementioned James Patent No. 2,681,525, discloses bows containing loops radiating in many directions from a central holding pin, and wherein a similar ribbon surface may be exteriorly exposed in all loops. But such bows as are disclosed in the later James patent are formed of individually formed loops each consisting of a separate independent strip. They are not susceptible of rapid production in large quantities, and are also rather limited in type and style. Welch Patent No. 2,763,080, granted September 18, 1956 and Ruiz et al. Patent No. 2,666,249, granted January 19, 1954, also are concerned with the formation of decorative bow structures.

To our knowledge no one heretofore has provided individualistic-appearing attractive ornamental bow structures of various shapes and configurations fashioned from continuous lengths of ribbon wherein the loops of ribbon are formed and disposed along numerous radii about the bow center (so that the loops are spread around said center similar to the arrangement of the petals of a flower), and wherein the loops of the bow, particularly in their curved or bight portions, are smoothly arcuate with the same surface of the ribbon exposed outwardly in each loop. Nor have methods and machines heretofore been devised, insofar as we are aware, for rapidly fabricating such bow structures in large quantities. Our invention is principally directed toward the satisfactory solution of these problems.

The decorative bows of the present invention are highly suited for use as ornamental decorations, particularly the packaging or gift wrapping fields; but elsewhere as well. For example, they form distinctive decorations for window displays, table displays, Christmas trees and such like. The ornamental bows hereof comprise a continuous length of strip material formed into a succession of loops radiating from a common point at the bow center along at least three radii. The loops of the bow are so fashioned that the same surface of the ribbon is exposed similarly outwardly in each loop. The two ends of the ribbon length of which the bow is formed terminate adjacent opposite surfaces of the bow, with central holding means retaining the several loops together in the desired relation at the bow center. In preferred bow structures the legs of each loop intersect at the bow center in face-to-back relation and remain essentially uncreased and unfolded while the bight portion of the loops remain smoothly arcuate, whereby unique radially symmetrical arrangements of loops can be obtained with the loops taking a generally conoidal shape with their small ends radially outermost. Additional objects of the present invention involve the provision of machines which combine a rotary, i.e., loop twisting, motion with a reciprocal motion for forming bow loops successively from a continuous length of strip material, as well as the manipulative steps involved in the production of the novel bow structures hereof.

The manner in which these and other objectives and advantages are attained by and in accordance with out invention will be readily apparent from the following detailed description of illustrative embodiments, especially in light of the accompanying drawings, wherein like reference characters refer to corresponding parts in the several views, and in which:

Figure 1 is a plan view of a three-point bow of the present invention;

Figure 2 is a plan view of a three-point bow shown in a partially completed state in order to illustrate the manner in which the same is manufactured;

Figure 3 is a perspective view of a central binding pin which can be used in the fabrication of the bows hereof;

Figure 4 is a perspective view of a bow fabricating machine hereof taken generally from the backside of the machine;

Figure 5 is a view of the machine of Figure 4 taken from the front side;

Figure 6 is a sectional view, taken generally along the lines 6—6 of Figure 4, showing the construction of the rotatable loop retainer assembly, but wherein the section at the forward portion thereof is taken at right angles as shown by the lines 6—6 of Figure 7;

Figure 7 is a sectional view taken along the lines 7—7 of Figure 6;

Figure 8 is an end elevation, partially broken away, showing the construction of the mandrel block;

Figure 9 is an end elevation, partially broken away, of the upper portion of the bow fabricating machine taken from the rearward end thereof;

Figure 10 is a sectional view taken along the lines 10—10 of Figure 4 showing the construction of the ribbon feed assembly;

Figure 11 is an elevational view of the ribbon feed assembly taken as indicated by the lines 11—11 of Figure 10;

Figure 12 is an elevational view of the ribbon feed assembly taken as indicated by the lines 12—12 of Figure 10;

Figure 13 is a schematic view showing the manner of operation of the loop retainer drive assembly;

Figure 14 is a schematic view, similar to Figure 13, further illustrating, in conjunction with the latter, the operation of the loop retainer drive assembly;

Figure 15 is a plan view of a bow hereof containing five groups of radially symmetrically disposed loops to give the appearance of a five-point star bow;

Figure 16 is a plan view of a randomly disposed multi-pointed decorative bow hereof; and Figure 17 is a plan view of a puff-type bow, fabricated on the novel machine hereof, wherein the loops of the bow are not of conoidal shape.

Referring now to Figures 1 and 2 the three-point bow shown comprises a continuous length of strip material formed into a succession of radially disposed loops 10, 11, 12, 13, 14, 15, 16, 17 and 18. Each of the loops is composed of a pair of legs, e.g., 10a, and 10b of loop 10, 11a and 11b of loop 11, 12a and 12b of loop 12, and a curved portion or bight connecting the legs. The legs of each loop intersect in face-to-back relation at a generally central point common with the points of intersection of the legs of the other loops. Actually the loops are not separate and distinct, all being successively formed from the same length of strip material. Each loop has a leg common with the opposite leg of each loop in immediate succession therewith. For instance, leg 10b of loop 10 is common with leg 11a of loop 11, the only loop in immediate succession with loop 10; while in loop 12, also in immediate succession with loop 11, leg 12a is common with the opposite leg 11b of loop 11.

The loops of the preferred bow shown in Figures 1 and 2 are of generally conoidal shape, having an appearance akin to that of a cone. The small end of the loop is radially outermost, the loops thus imparting the illusion of pointing outwardly like the points of a star.

At the central point where the loop legs intersect the loops are bound together in generally fixed relation by a pin member 19 upon which said legs are impaled as the loops are formed. As shown particularly in Figure 3 said pin comprises a shaft 20, a broad flat base 21 and a conical point 22 the inner surface of which has a diameter exceeding that of shaft 20. Thus the point 22 and the head 21 keep the legs of the loops from radially slipping off of shaft 20 once the strip material has been impaled over the point 22. This is true with respect to point 22 even though the ribbon initially was impaled upon the pin over said point, and particularly true with strip material which contains fibers in both the lengthwise and cross directions, such as "Sasheen" brand decorative ribbon available from the Minnesota Mining and Manufacturing Company, St. Paul, Minnesota.

The conoidal-shaped loops are arranged into three families of loops uniformly radially distributed about pin 19, these families each forming a "point" in the bow. Loops 10, 13 and 16 form family A. Loops 11, 14 and 17 form family B. Loops 12, 15 and 18 form family C. The loops in each family, for example loops 10, 13 and 16, are similarly shaped with the legs of each loop of the family intersecting at substantially the same angle. However, the loops within each family are of different length, e.g., the length of loop 13 extends radially outwardly of and about loop 10; similarly the length of loop 16 is greater than that of loop 13, loop 16 thus extending radially outwardly of and about both loops 10 and 13. Also, at the center of the bow similar legs of the loops in each family are in substantial registry and in superposition. The loops of each family have a common radial bisector 24A, 24B and 24C. The angle between the bisectors of adjacent families of loops, by which the radial disposition of the families is measured, in the three-point bow shown is about 120 degrees.

Since the bow is a symmetrical one, corresponding loops of each family are of substantially identical lengths and shape. That is, loops 10, 11 and 12 are of the same length and shape, as are loops 13, 14 and 15, and as are loops 16, 17 and 18.

As can be seen from the three-dimensional appearance of Figures 1 and 2, the loops of the three-point bow are formed about the head or base end 21 of pin 19, as distinguished from the pointed end of said pin. Hence, the logical front or face surface of the bow is that to which the pin base 21 is adjacent. Such is also the case with the other bows hereof wherein the loop legs intersect in uncreased face-to-back relation. Accordingly, bows of this type conveniently can be attached to a package wrapper such as paper or thin cardboard by pressing the pin of the bow into the package wrapper much like pressing a thumb tack into place. The point 22 pierces the package wrapper and, once on the inside of the wrapper, retains the bow in place.

The manner in which the bow in Figure 1 is formed can be illustrated with the aid of Figure 2. A continuous length of decorative ribbon is grasped at two spaced points along its length, one of which points is adjacent the free end 23 of the ribbon. The portion of the ribbon between said points is then twisted lengthwise and the ribbon at said two points brought together in face-to-back relation to form a loop 10 with the legs 10a and 10b thereof intersecting at an angle of 60 degrees. The twist employed in forming the loop is in a single direction, i.e., is unidirectional. It is sufficient to permit the face surface of one leg 10a, to be brought in contact with the back surface of the leg 10b, i.e., in face-to-back relation, where the two legs overlap, while the bight of the loop remains smoothly arcuate and the legs remain smooth and uncreased. Pin 19 is then inserted through legs 10a and 10b where they intersect, by impaling said legs over the point 22 and on to shaft 21 of pin 19. Thereby the loop legs are retained together.

The first loop 10 is then grasped about pin 19 and the ribbon is grasped at a third point along the continuation of leg 10b at a distance from the pin equal to the length of loop 10. The ribbon between the pin and said third point is twisted in the same direction as before and at the same time the ribbon, at said third point, is brought into contact with and impaled on pin 19 in face-to-back relation with the portion of ribbon forming continuation of leg 10b. Thus is defined a second loop 11 with legs 11a (the said continuation of leg 10b) and 11b intersecting at an angle of 60 degrees. Loop 12, having legs 12a and 12b intersecting in face-to-back relation at an angle of 60 degrees with leg 12a being common with leg 11b, is similarly formed, the ribbon being twisted in correspondingly the same direction as in formation of the previous loops 10 and 11. The continuation of leg 12b will be seen to be in substantial registry and in superposition with leg 10a of loop 10, three loops radially symmetrically arranged about central pin 19 having been formed.

Loop 13 is then formed in a similar manner as were the previous loops 10, 11 and 12, except that the length thereof is greater than that of the previous loops. This is accomplished by grasping the ribbon at a point along the continuation of leg 12b a distance from pin 19 greater than the length of the previous loops. The ribbon is twisted in the same direction as before and the ribbon impaled on pin 19 to define loop 13 having legs 13a and 13b intersecting in face-to-back relation at an angle of 60 degrees, leg 13a being a continuation of leg 12b of loop 12. Since the angle of intersection of the legs of 13a and 13b of loop 13 is the same as the angle of intersection of legs 10a and 10b, leg 13a lies in substantial registry and in superposition with leg 10a, and leg 13b lies in substantial registry and superposition with leg 10b. Thus loop 13 extends radially outwardly of and about loop 10. Also, the two loops 10 and 13 have a common radial bisector. These two loops define a part of family A, one of the three radially symmetrically disposed families which form the bow of Figures 1 and 2.

The bow is then completed by similarly forming loops 14 and 15, about loops 11 and 12, respectively. Then loops 16, 17 and 18, of greater length than of the previously formed loops, are similarly formed radially outwardly of and about loops 13, 14 and 15, respectively.

Since the loops of the bow are successively formed of a continuous length of ribbon, and further since the loop legs and their continuations (forming legs of other loops) extend straight and uncreased, the angle at which the legs of each loop intersect is determinative of the radial disposition of the several loops about the bow center, as measured between adjacent radial bisectors. Thus it is the 60 degree angle of intersection of the legs of each loop in the bow shown in Figures 1 and 2 which permits the formation of the symmetrical three-point bow. If such angle in the first loop were greater, or lesser than 60 degrees, the radial bisector thereof and that of the next loop, formed like the first, would define an angle of less than 120 degrees, and greater than 120 degrees, respectively. Hence, in such cases, three symmetrically disposed loops could not result without creasing or bending the loop legs.

Other bows having symmetrically arranged families of loops, wherein the legs of each loop intersect in uncreased face-to-back relation, can be formed in accordance with the principles hereof. For example, a symmetrical five-point bow, such as that shown in Figure 15, can be made where the legs of each loop intersect at an angle of 36 degrees, the length of each of the second five loops being greater than that of the first five, and the length of each of the third five loops being greater than that of the second. Bows also can be formed wherein the loops are not arranged in individual symmetrical groups, upon appropriate choice of angles of loop leg intersection, due regard being had for the geometric principles involved. Such a bow is shown in Figure 16. Bows also can be formed in accordance with the present invention wherein the loops are not conoidal, but instead appear to be bent back over on themselves; see Figure 17. Further, although preferred bows hereof have straight uncreased loop legs, bows also can be formed of loops wherein the loop legs are twisted so as to be folded or creased adjacent the bow center. As will be shown hereinafter, the bow shown in Figure 17 can be fashioned in this manner. Many other bows, containing various numbers and arrangements of loops, and combinations thereof, can be formed in accordance with the teachings hereof. However, the more complicated configurations of bows just mentioned, and illustrated in Figures 15–17, and the mode of their formation, are conveniently described and understood in conjunction with the operation of the novel bow fabricating machine hereof. Detailed description of these structures thus will await that of the machine, which will now be described.

Reference is now made to Figures 4 to 14 which show a specific embodiment of the novel bow fabricating machine hereof. Generally the machine is made up of a ribbon supply assembly 30 and reciprocal feed assembly 31. The latter reciprocates, alternately to withdraw strip material from supply 30 and to form the withdrawn length of strip material into loops on loop retainer assembly 32, with which said feed assembly 31 cooperates as hereinafter described, the loops being retained on said retainer assembly 32. Ribbon feed drive 33 causes ribbon feed assembly 31 to reciprocate, whereby loops are successively formed and applied to retainer assembly 32. Loop retainer drive assembly 34 causes loop retainer assembly 32 intermittently to rotate. Thereby, loops applied to retainer assembly 32 are twisted and the legs of said loops brought together in the desired relation, and the loops are formed at appropriate angles with respect to one another. Both drive assemblies 33 and 34 are actuated by rotation of a single crank or motor driven pulley.

More specifically, our machine is disposed on a base 40 provided at one end with a ribbon guide post 41 of inverted U-shape with the vertical supports 42 thereof fastened adjacent the lateral sides of said base 40. Connecting said supports 42 at their upper ends is guide bar 43. Also disposed between connecting said supports below and spaced from guide bar 43 is cross bar 44. Approximately midway between the ends of base 40 and toward one edge thereof is vertical standard 45 which extends somewhat higher than guide post 41. Mounted adjacent the end of base 40 opposite guide post 41 is crank and mandrel block 46 having an extension block 47 protruding from the lower portion of the back face thereof.

For convenience of description, although other reference guides could as well be employed, the end of the machine adjacent guide post 41 arbitrarily will be referred to as the forward end, while the opposite end will be referred to as the rear or rearward end.

The rotary loop retainer assembly 32 is mounted in mandrel block 46. With particular reference to Figures 6 and 7, block 46 is drilled in the lengthwise direction adjacent its upper end, through which extends spindle 48. Said spindle is retained in position within the bore by bushings inserted at either end thereof.

The portion of the spindle 48 forwardly of the block 46 is of somewhat complex configuration and is formed into an enlarged cylindrical brake drum 49 which is turned down slightly at its forward end to define an annular seat 50. Forwardly of drum 49, spindle 48 is formed into a cylindrical pin holder support 51 of smaller diameter than drum 49, said support and drum being separated by annular groove 52. Forwardly of pin holder support 51, spindle 48 terminates in a sleeve support 53 which is of smaller diameter than support 51. Sleeve support 53 is provided with a lengthwise slot 54 extending diametrally therethrough, said slot also extending rearwardly partially through support 51. The spindle 48 is bored axially therethrough from the rearward end, the bore thus communicating with slot 54. Within said bore is slidably positioned an elongate ejector rod 55 having a ball handle 56 at its rearward end.

A pair of pin holders 59 of the configuration shown are each supported by and bear against support 51 along their rear portions 60, said holder terminating in rearward projections 61 disposed in the aforementioned groove 52 of spindle 48. Cam 62, positioned toward the middle of each of said pin holders, extends inwardly into the rear portion of the diametral slot 54. At their forward ends said pin holders are each provided with an inwardly extending prong 63 and a radially outwardly extending sleeve retainer tang 64. The pin holders 59 are retained in place by elastic O-rings 65, which extend over the pin holders in grooves provided therefor, and about pin holder support 51.

When ejector rod 55 is disposed in a rearward position O-rings 65 urge pin holders 59 to a generally parallel position, their inward travel being normally limited by the pin holder support 51 against which they bear. When the ejector rod 55 is pushed forwardly its forward end engages cams 62 of the pin holders 59 and spreads them radially outwardly, causing the pin holders to pivot, against the force of O-rings 65, about their rearward projections 61 in groove 52. Thereby prongs 63 are spread. Upon withdrawal of rod 55 the pin holders 59 are returned to their normal position by O-rings 65.

Slidably positioned on and about sleeve support 53 of spindle 48 is annular sleeve 66. Said sleeve is provided with a lengthwise extending diametral slot 67 of the same width as slot 54 in spindle 48. At the forward end of sleeve 66 slot 67 extends diametrally entirely through the sleeve, whereas toward the rear of the sleeve, said slot 67 extends less than all they way therethrough. A shoulder 68 is defined at the junction of where slot 67 becomes of enlarged diametral extent.

When the sleeve 66 is in position, pin holders 59 extend within the slot 67 of said sleeve. Tangs 64 of pin holders 59 limit the forward movement of sleeve 66 at the point where they engage the shoulder 68 thereof. In such forward position sleeve 66 extends forwardly of support 53, and a cavity 69 is defined in the center of said sleeve with the forward edge of spindle 48 serving as the base. The rearward movement of the sleeve is limited by the point at which it bears against forward edge of pin holder support 51 of spindle 48. It will be observed that as sleeve 66 is moved rearwardly, cavity 69 becomes shallower; and when sleeve 66 is moved forwardly again cavity 69 deepens.

The rear surface of sleeve 66 is turned down slightly at its periphery to define an annular shoulder 70. Coil spring 71 is positioned with one end seated in shoulder 50 and the other end seated in shoulder 70 of sleeve 66. Thereby sleeve 66 is urged to a normally forward position.

When it is desired to position a pin 19 in the machine preparatory to making a bow, ejector rod 55 is pushed to a forward position spreading the pin holders 59 within slot 67 of sleeve 66. The pin is then inserted, base first, into cavity 69 until it abuts spindle 48. The ejector rod is then withdrawn rearwardly until the pin holders 59 converge with the prongs 63 engaging the base 21 of the pin 19. Thus the pin is held securely in place. When it is desired to release the pin, the pin ejector is shoved forward thereby spreading the pin holders 59 so as to release the pin.

The loop retaining assembly 32 can be disassembled upon depressing pin holders 59 at their forward ends thereby freeing them of shoulder 68 of sleeve 66. This may be done, for example, by pushing inwardly on tangs 64 within slot 67 with a pointed instrument such as a pencil. Upon depression of pin holders 59 the force of spring 71 causes sleeve 66 to travel forwardly so that it comes free of the spindle 48. Then, spring 71 may be removed following which access may be had to O-rings 65 and pin holders 59 for their removal. Assembly occurs in the reverse order of disassembly.

Extending forwardly from the top surface of the mandrel block, so that it extends over the drum 49 is leaf spring 80, said spring being fastened to the mandrel block adjacent its rearward end by bolt 81. Disposed between the forward end of spring 80 and the drum 49 so as to bear against the latter is brake 82, which can be composed of leather or other suitable material. The compressiveness with which brake 82 bears against drum 49 is adjusted such that free rotation of the spindle is limited, although the spindle can, without undue difficulty, be rotated against the action of the brake.

Journaled about the portion of spindle 48 extending rearwardly of mandrel 46 is a one-way clutch assembly, which forms part of rotary drive assembly 34. Said clutch assembly consists of a drive member, a driven member and a clutch spring. The drive member takes the form of a sprocket 83 having a cylindrical rearward extension 84, said sprocket being rotatably journaled about spindle 48. The driven member consists of a knurled member 85 having a forward extension 86, said forward extension having the same outer diameter as the rear extension 84 of sprocket 83. The driven member is journaled about spindle 48 with extension 86 abutting extension 84, and is fixedly positioned with respect to the spindle by set screw 87. Disposed about the extensions 84 and 86 is clutch spring 88, the coils of which normally lightly contact the periphery of said extensions.

The one-way clutch assembly functions as follows: When the sprocket 83 is rotated in the direction in which spring 88 is wound, the frictional contact between the surface of extension 84 and the coils causes the latter to become more tightly wound against said extension and hence to rotate therewith, and with the sprocket 83. This rotation almost simultaneously causes the remaining coils of spring 88 to tighten against the periphery of extension 86 of the driven member thereby causing the driven member to rotate. However, when the sprocket 83 is rotated in the opposite direction, the tendency is for the spring coils to loosen and extension 84 to slip with respect to the coils, no rotational motion being transferred to the driven member of the clutch assembly.

With particular reference to Figure 8, block 46 is also bored transversely somewhat below the bore accommodating spindle 48, but well above the upper surface of lateral extension block 47. Rotatably disposed within said bore is cylindrical index tube 99. Journaled about the end of said tube protruding from the front face of block 46 is knurled index knob 100 have a flange 101 containing a graduated scale. Said knob 100 is fixedly positioned on said tube by means of a set screw 102. Journaled about the end of tube 99 protruding from the back surface of block 46 and permanently fixed thereon is cylindrical collar 103. Fixed to said collar, for example by being welded thereto, is right angular index arm 104 the fixed leg of which extends perpendicularly with respect to index tube 99 and the free leg extending parallel to said tube and thus perpendicular to said fixed leg. Said index arm 104 is provided with an aperture 105 adjacent its free end.

Extending perpendicularly with respect to tube 99, from the rear surface of block 46, is a set screw 106 (Figure 6). Interposed between the inner end of said set screw and tube 99 is a small leather disc 107 and spring 108. The set screw 106 normally is turned into block 46 such that leather disc 107 is compressed by spring 108 slightly against tube 99. Free rotation of the latter there is restricted, although set screw 106 normally is not turned so tightly tht tube 99 cannot be rotated without undue exertion by turning index knob 100 with the fingers. The purpose and function of the index assembly just described will appear shortly.

Extending within index tube 99, freely rotatable with respect thereto, is crank shaft 110. To the end of shaft 110 protruding beyond index knob 100 is affixed a hand crank 111 by means of a set screw. Journaled about the other end of shaft 110 protruding beyond collar 103, and fixed thereto by means of set screw 112, is eccentric disc 113, said shaft extending through the center of said disc. Eccentric pin 114 extends through eccentric disc 113 adjacent the periphery of the latter in a direction away from block 46 and parallel to crank shaft 110. Said pin 114 is fixed in position by means of a set screw 115 extending from the peripheral surface of disc 113. A second eccentric disc 116, having the same diameter as disc 113, is fixedly positioned on the free end of eccentric pin 114 spaced from but in coaxial registry with disc 113 by means of set screw 117. Thus as shaft 110 rotates, both eccentric discs 113 and 116 rotate about their centers. Rotatably journaled about eccentric pin 114 is eccentric pulley 118 which revolves about the centers of discs 113 and 116 as the latter rotate.

It will be noted that index arm 104 extends radially a sufficient distance beyond discs 113 and 116 so as not to obstruct the latter. Also said arm extends laterally at least opposite the space between discs 113 and 116 such that aperture 105 aligns with the groove of pulley 118. These, along with tube 99 and knob 100 form a part of the loop retainer drive mechanism 34. The remainder of said mechanism will now be described.

Positioned toward the bottom of extension block 47 on an axis parallel with tube 99 and shafts 110 is rotatable idler pulley 119, the width of said block 47 being such that the groove of pulley 119 aligns with the groove of eccentric pulley 118. A second idler pulley 120 is rotatably mounted on block 47 toward the top thereof on a horizontal axis perpendicular to that of pulley 119. Said pulleys 119 and 120 are mutually positioned on their respective axes such that their grooves define a common vertical tangent. The groove of pulley 120 further aligns with sprocket 83 of the one-way clutch assembly. A flexible bead chain 121, is fastened at one end through the aperture 105 of index arm 104. Said chain extends rearwardly of eccentric pulley 118 downwardly around and under idler pulley 119 thence around and over idler pulley 120, so that the direction of the chian is altered at right angles. The chain then passes underneath, around and back over sprocket 83, with the beads of the chain engaging the cogs of the sprocket. The chain then is connected to the free end of chain return spring 122, which is anchored to the back edge of base 40 in line with the grooves of idler pulley 120 and sprocket 83. Said spring functions to maintain chain 121 under tension at all times when extending around sprocket 83.

Eccentric pulley 118, in cooperation with the other components of the loop retainer drive assembly 34, translates the rotary motion of crank shaft 110 into reciprocal motion in the chain 121 about sprocket 83 when hand crank 111 is turned. The manner in which this occurs will now be described.

With reference to the diagrammatic Figures 13 and 14, wherein for purposes of simplification pulley 120 and sprocket 83 have been omitted and wherein the actual configuration which chain 121 takes about these omitted components has been altered. In each of these figures full lines are employed to represent the position of eccentric pulley 118, chain 121 and spring 122 when pulley 118 is in a first position during rotation of disc 113. Broken lines indicate these elements when pulley 118 has revolved to a second position upon rotation of disc 113 in the direction of the arcuate arrows thereon.

As eccentric pulley 118 revolves from the first position to the second position, as disc 113 rotates, it will be seen that the path from the fixed point at index arm 104 around moving pulley 118 to fixed pulley 119 continuously decreases in length. Thus, return spring 122 continuously draws chain 121 about pulley 119 as this occurs. By the time pulley 118 has revolved to the second position, the portion of chain 121 between pulley 119 and the spring moves a distance represented by the double headed arrows, the spring, of course, contracting a like distance.

The second position of pulley 118 in both Figures 13 and 14 represents the maximum travel of chain 121 in the direction of contraction of spring 122 for the respective settings of index arm 104. The difference in the length which the chain travels in the two figures shortly will be discussed.

As the eccentric disc 113 continues to rotate beyond the respective second position shown in Figures 13 and 14, the length of the path extending from index arm 104 around pulley 118 to pulley 119 begins to increase continuously until the first positions again are reached. As said lengths increase chain 121 is withdrawn around pulley 119 against spring 122 until the first position of the chain and spring are reached. Thus as disc 113 rotates, and eccentric pulley 118 revolves thereabout, chain 121 travels reciprocally between pulley 119 and return spring 122. It will be apparent from Figure 5 that sprocket 83 oscillates in response to the movement of chain 121 extending thereover.

As above described in connection with the description of the operation of the clutch assembly, sprocket 83 causes spindle 48 to index, i.e., to rotate, only when the sprocket rotates in one direction. Hence, the oscillation of sprocket 83, in response to reciprocation of chain 121 as the hand crank is turned, causes intermittent unidirectional indexing in said spindle.

Upon comparison of the two figures, which are scaled with respect to one another, it will be seen that the distance chain 121 travels in Figure 14, as it reciprocates between the first and second positions, is much greater than the corresponding distance in Figure 13. This is due to the different settings of index arm 104, movement of which is accomplished by rotating index knob 100 (Figures 5 and 8). Within limits, as said index arm is moved still further in the direction away from the setting in Figure 13, the distance through which chain 121 travels, as it reciprocates, increases still more. On the other hand, as said index arm is moved back toward and beyond the setting shown in Figure 13, the distance of travel decreases. The difference in the distance chain 121 travels for each complete turn of hand crank 111 as the setting of index arm 104 is varied, of course, is reflected correspondingly in the degree of unidirectional rotation of the rotary loop retainer assembly 32.

As shown in Figure 9, standard 45 is provided with a transversely extending bearing sleeve 130 through which is rotatably positioned horizontal shaft 131 extending cantileverly over base 40 in a direction perpendicular to that of spindle 48. Affixed at the end of shaft 131, where it protrudes beyond sleeve 130, is snap ring 132. Fixedly journaled about shaft 131 on the opposite side of bearing sleeve 130 from snap ring 132 is an upwardly extending member 133 having a function shortly to be described. Also fixedly journaled about said shaft 131, on the side away from sleeve 130 and extending downwardly generally in line with member 133 is reciprocal ribbon feed lever 134. Said lever rotates in a plane adjacent standard 45, and parallel to the axis of spindle 48. Since both lever 134 and member 133 are fixed with respect to shaft 131, they move as a unit when shaft 131 rotates within bearing sleeve 130. About shaft 131, toward the free end thereof, compression spring 135 and annular stock roll side plates 136 and 137 are positioned in the order named. Side plate 136 is rotatable with respect to shaft 131 while side plate 137 is provided with a hub 138 through which extends a thumb screw 139 for adjustably positioning said side plate 137 on said shaft 131.

To the lower end of reciprocal lever 134 is the reciprocal ribbon feed assembly 31, which will now be described with reference to Figures 5, 10, 11 and 12. Extending horizontally from the lower end of lever 134, in the direction away from standard 45, is shuttle block 150, said block having a flat upper surface. Bolted to the forward end (toward guide post 41) of shuttle block 150, and extending upwardly therefrom is ribbon guide 151. Centrally of said ribbon guide a section 152 thereof is rolled upwardly from its under edge to define a crosswise extending aperture 153 between said rolled section 152 and shuttle 150. Thus as a length of ribbon or strip material is led around the guide bar 43 of guide post 41 and thence to the reciprocal ribbon feed assembly, the strip material passes through said aperture 153 and in contact with said rolled section 152. Said section functions to provide a smooth surface over which the ribbon passes.

Tab 154 of ribbon guide 151, disposed toward the free end of shuttle block 150 from aperture 153, is not fastened to shuttle block 150, but is bent away therefrom slightly. Thus ribbon can be passed between said tab 154 and shuttle block in "loading" the machine.

Affixed to the surface of ribbon guide 151 facing mandrel block 46 is leaf spring 155. Said spring extends downwardly and away from the ribbon guide 151, centrally with respect to aperture 153 and bears at its free end against the upper flat surface of the shuttle block 150.

Said spring freely allows strip material passing between it and shuttle block 150 to slide with respect to the latter in the direction toward retainer assembly 32. That is, shuttle block 150 easily slides along and with respect to the ribbon as the feed assembly moves away from retainer assembly 32 as the ribbon remains stationary. But when pulled in the opposite direction, the strip material engages the end of spring 155 causing it to bear thereagainst and preventing slippage. Thus spring 155, in conjunction with shuttle block 150, serves as a oneway clutch or unidirectional feed mechanism.

Extending perpendicularly with respect to shuttle block 150 toward spindle 48 and in line with aperture 153 is cylindrically shaped shuttle 156. The length of lever 134, the length of shuttle 156 and its position with respect to shuttle block 150 are such that when lever 134 is rotated or moved toward mandrel block 46, the free end of shuttle 156 comes into contact with the forward end of sleeve 66 on a horizontal co-axis, feed assembly 31 and part of lever 134 being shown in this position in broken lines in Figure 5. The forward end portion of the shuttle 156 is recessed for a distance along its length to provide a cavity 157 (Figure 10).

Pivotally affixed toward the free end of shuttle 156 is ribbon curling guide 158. Said ribbon curling guide 158 consists of a pair of spaced arcuate members 159 and 160 joined at their respective ends to define a curved aperture 161 having downwardly turned ends. Said guide 158 is pivotally attached to shuttle 156 on a transverse axis through spaced arms 162 and 163, which extend downwardly on either side of shuttle 156. Pin 164 extends through said arms and shuttle on said axis. Said curling guide 158 is positioned adjacent the free end of shuttle 156 with arcuate members 159 and 160 upwardly thereof. Coil spring 165 is disposed in slight tension between the lower end of arm 162 below pin 164 and fastening screw 166, which extends into the underside of shuttle block 150. Thus said spring 165 urges ribbon curling guide 158 to a normally rearward position as shown in Figure 10. In such position, a length of strip material, represented by broken line L in Figure 5, passing through aperture 161 extends at an angle downwardly over the free end of shuttle 156. Said length of strip material, for a distance adjacent guide 158, is arched width-wise thereof by virtue of the curvature of aperture 161, and thus is stiffened lengthwise. The function and purpose of the ribbon feed assembly 31 and the various components thereof will appear shortly.

Adjustable reciprocal feed drive 33 shown principally in Figures 4 and 9 causes lever 134 to rotate back and forth about shaft 131, and therewith causes shuttle 156 to reciprocate toward and away from spindle 48, upon rotation of hand crank 111. Fixed to and extending rearwardly from upwardly extending member 133 is arcuate adjustment arm 170. For reasons which will become apparent shortly, said adjustment arm is so shaped and positioned, with respect to lever 134, that it extends for a distance essentially along the arc defined by a radius extending from the center of second eccentric disc 116 when lever 134 is in position with shuttle 156 in contact with sleeve 66.

Adjustably positioned on adjustment arm 170 is a clamp bar assembly consisting of a clamp bar 171, clamp bar cover 172 and thumb screw 173. Clamp bar 171 is provided with a groove extending thereacross into which groove slidably fits adjustment arm 170 as shown. The depth of said groove is slightly less than the thickness of arm 170 such that when said arm is in position within the groove, the arm protrudes slightly. Cover 172 extends across the groove in clamp 171 and over arm 170. Said cover is affixed at its lower end to clamp bar 171 by means of bolts 174. Thumb screw 173 extends through the portion of cover 172 above arm 170 and into clamp bar 171. Thus, when the screw 173 is loosened the clamp bar assembly can be slid along adjustment arm 170 and then, when in the desired position, can be fixed in place by tightening said thumb screw which causes cover 172 to bear tightly against adjustment arm 170.

Pivotally fastened to the lower end 175 of clamp bar 171 by means of pin 180 and clevis 181, is spring take-up housing 182. The latter is bored throughout its length and counterbored from its upper end to define recess 183 into which is disposed take-up spring 184. Fitting into the upper end of recess 183, and fixed therein, e.g., by means of pin (not shown), is the lower end 185 of clevis 181. Said lower end provides a surface against which spring 184 bears at the upper end thereof. Slidably extending into housing 182 from the lower end thereof and into said recess 183 is connecting rod 186. Said rod is provided at its upper end with a snap ring 187 extending into an annular groove provided therefor. Said snap ring bears against the lower end of spring 184, and also limits the travel of rod 186 out of housing 182 where snap ring 187 bears against the bottom of recess 183.

Connecting rod 186 terminates at its lower end in connecting rod eye 188. The latter is pivotally fastened eccentrically to eccentric disc 116 by means of bolt 189, which passes through said eye and extends into disc 116.

The desired reciprocal motion of shuttle 156 upon rotation of the crank 111 is accomplished as follows: As said crank is rotated eccentric discs 113 and 116 rotate about their centers as above described. As disc 116 rotates, said rod eye 188 revolves thereabout causing a reciprocatory motion in connecting rod 186 which is transferred to lever 134 through take-up spring 184, housing 182, clevis 181, clamp bar 171, adjustment arm 170 and member 133. During said rotation, as rod eye 188 approaches and reaches its uppermost position shuttle 156 approaches and contacts sleeve 66, forcing the latter rearwardly against spring 71. Should shuttle 156 force sleeve 66 to its maximum rearward position slightly before rod eye 188 and connecting rod 186 reach their position of maximum upward travel, spring 184 within recess 183 takes up the remaining upward motion of rod 186.

Then as disc 116 continues to rotate rod eye 188 commences to travel downwardly thus pulling connecting rod 186 to its downward position with snap ring 187 bearing against the bottom of recess 183, at which time, housing 182 and therewith arm 170 are pulled downwardly. This causes lever 134 and shuttle 156 to move away from spindle 48.

Preferably loop retainer assembly 32 rotates only when out of contact with reciprocal feed assembly 31. This is accomplished by appropriately positioning rod eye 188 on disc 116 such that when said eye is at or adjacent its upward position chain 121 is not traveling in the direction which, due to the action of the one-way clutch assembly, causes rotation in spindle 48.

Since adjustment arm 170 is arcuately shaped to lie on the arc defined by a radius from the center of disc 116 at the time shuttle 156 is in the full rearward position in contact with sleeve 66, it will be observed that irrespective of the position of clamp bar 171 on adjustment arm 170, the maximum rearward travel of the shuttle 156 remains substantially the same. However, the maximum travel of lever 134 and shuttle 156 away from spindle 48 is dependent upon the position of clamp bar 171 on adjustment arm 170. This is illustrated in Figure 5, wherein the maximum position of lever 134 and shuttle 156 away from spindle 48, when clamp bar 171 is positioned closely adjacent the free end of adjustment arm 170, is shown in full lines. As clamp bar 171 is moved along adjustment arm 170 away from the free end of the latter, the maximum position of lever 134 and shuttle 156 away from spindle 48 increases. The maximum position of lever 134 and shuttle 156, when clamp bar 171 is positioned at the extreme inner end of adjustment arm 170 is illustrated in Figure 5 with these elements being shown in broken lines. It will thus be apparent that the length of ribbon withdrawn from a supply, and thus the length of loop formed on the loop retainer assembly 32 can be varied as desired by appropriately adjusting the position of clamp bar 171 on arm 170. Only this single adjustment is necessary to vary loop length.

Our novel bow machine is employed as follows, in fabricating the decorative bows hereof. A supply roll of strip material, for example decorative ribbon, is mounted on shaft 131 between side plates 136 and 137, by removing side plate 137, journaling the supply roll about said shaft and then repositioning side plate 137. The stock roll is positioned with slight compression urged upon spring 135 just so that the supply roll will not freely rotate on the shaft, although it readily will rotate in response to withdrawal of a length of ribbon therefrom. Ribbon is then withdrawn from the supply roll and led around and under guide bar 43, between it and cross bar 44. The ribbon is then passed through aperture 153 by slipping it laterally between shuttle 150 and tab 154 of ribbon guide 151. Simultaneously the ribbon is slipped under leaf spring 155 between it and shuttle block 150. Then the ribbon is passed through curved aperture 161 in curling guide 158. The end portion L of ribbon (Figure 5) initially extending through said aperture 161 is automatically directed downwardly opposite the end of shuttle 156, by virtue of the normal position of curling guide 158. Also, said end portion is arched across its width and thereby strengthened lengthwise.

With lever 134 and shuttle 156 in a position spaced from loop retaining assembly 32, a central holding pin 19 is inserted into said assembly, in the manner above described, and locked into place. Crank 111 is then turned or rotated. Shuttle 156, in response to such rotation, approaches sleeve 66, the ribbon extending from curling guide 158 being interposed therebetween. As the crank is further rotated, shuttle 156 comes into force conatct with sleeve 66 (through the interposed ribbon) forcing said sleeve to its rearward position, whereby point 22 of pin 19 is exposed and the ribbon is impaled thereon. As shuttle 156 forces sleeve 66 rearwardly the pointed end portion of pin 19 extending through the ribbon impaled thereon, extends into cavity 157 of shuttle 156.

All the while shuttle 156 moves toward and against sleeve 66, leaf spring 155 grips the ribbon between it and shuttle block 150, and thus ribbon, passing from the supply roll about guide bar 43 in the path shown by broken lines R in Figure 5, is withdrawn from the supply roll. Guide post 41 being positioned at the extreme forward end of the machine, it will be seen that ribbon is withdrawn only as the ribbon feed assembly 31 moves toward loop retainer assembly 32. No ribbon is withdrawn as said feed assembly moves away from the loop retainer assembly. In this manner, tension on the length of ribbon affixed at its end to pin 19 is minimized preventing the ribbon from being pulled off of the pin.

Upon further rotation of crank 111, shuttle 156 commences to move in the direction away from loop retainer assembly 32, at which time spring 71 forces sleeve 66 forwardly against the ribbon impaled about shaft 20 of pin 19. This presses the portion of ribbon immediately about said shaft (even though somewhat torn or split due to its previous passage over the point 22) firmly against the inner surface of point 22 of pin 19. Thus the ribbon is prevented from being forced off of pin 19, and also from slipping on the pin as the spindle rotates in response to the action of drive assembly 34.

As shuttle 156 continues its stroke away from the loop retainer assembly 32, the length of ribbon between it and pin 19 is pulled under slight tension causing leaf spring 155 to lift slightly from the ribbon. Thereby the feed assembly readily slips along the ribbon extending between pin 19 and guide bar 43. Also, by way of easing the pull on the length of ribbon extending from pin 19, frictional forces exerted between the ribbon and the forward edge of arcuate member 159 of curling guide 158 against which the ribbon slides, causes said curling guide to pivot against the tensional force of spring 165.

Upon reaching its maximum position away from the loop retainer assembly 32, feed assembly 31 reverses its direction and again travels toward the former. The direction of pull on the ribbon is thereby reversed and leaf spring 155 again bears against the ribbon preventing slippage as the feed assembly moves. Thus ribbon is withdrawn from the supply roll around guide bar 43, as before. Also, the length of ribbon retained between pin 19 and shuttle 156 becomes slack, ribbon curling guide 158 again pivoting to its normal position. The slack length of ribbon forms a loop, the portion adjacent and attached to pin 19 being the first leg; that portion adjacent shuttle 156 being the second leg.

During the interval when the ribbon feed assembly 31 is out of contact with loop retaining assembly 32, the latter is rotated by drive assembly 34. Thereby the loop being formed is twisted through the angle through which spindle 48 rotates. Guide 158 causes the portion of ribbon next adjacent shuttle 156 always to extend downwardly over the end of said shuttle during loop formation, irrespective of the degree of rotation of spindle 48. Thus, as previously, when ribbon feed assembly 31 moves against loop retainer assembly 32, the ribbon adjacent shuttle 156 is interposed therebetween and is impaled about the pin.

As the crank 111 is further rotated new loops are formed. Sleeve 66, by virtue of the action of spring 71, firmly retains the layers of ribbon impaled on the pin firmly, so that they do not slip as the spindle rotates during formation of subsequent loops. Each time ribbon feed assembly 31 travels away from, and returns toward, loop retaining assembly 32 forming a new loop, loop retaining assembly 32 rotates to twist said new loop.

After the desired number of loops have been impaled on the pin 19, the ribbon is cut between the bow and the feed assembly. The completed bow is then freed from the machine by pushing ejector rod 55 to its forward position to release pin 19, now part of the bow. Since sleeve 66 is disposed rearwardly of its normal position by the numerous layers of ribbon on the pin, the pressure of sleeve 66 on the bow ejects the latter from the machine when the ejector rod is pushed. Particularly is this true of bows containing many loops. In any event, the bow is easily freed from the machine.

Although in the foregoing description the operation of the machine has been recited in a series of individual steps, actually the operation can be continuous with the crank being rotated continuously throughout the formation of a bow. The crank also can be replaced by a pulley driven by motor means, if desired.

It will be observed that by varying the amount of index of loop retaining assembly 32 per loop, i.e., per revolution of crank 111, the angle with which the loops are formed with respect to one another can be controlled. Thus, by indexing spindle 48 to the proper degree, bows are fabricated wherein the loops are formed with respect to one another in symmetrical radial disposition. For example, bows containing three, four or five or more symmetrically radially disposed loops or families of loops can be formed, as will be hereinafter illustrated.

To facilitate the selection of the desired amount of rotation of the loop retainer assembly 32, the flange of index knob 100 may contain a calibrated scale, and a reference mark 190 (Figure 5) placed on mandrel block 46 opposite said flange, so that the desired type and number of loops can be made merely by turning index knob 100 to a desired position as indicated on the calibrated scale.

The manner in which various bow structures are fabricated on our machine will now be described.

The appropriate angle of index of the loop retainer assembly is first ascertained. In fabricating preferred bows hereof each loop must be twisted 180 degrees, in addition to the degree of unidirectional twist necessary for the loop legs to intersect. This is necessary to accommodate the legs of the loop being brought into face-to-back relation so that the loop legs remain uncreased or unbent and the loop bights remain smoothly arcuate. Accordingly in computing the desired degree of index of loop retainer assembly 32, 180 degrees are added to the desired angle of leg intersection. It will be recalled that in the three-point "star" bow of Figures 1 and 2, the legs of each loop intersect in face-to-back relation at an angle of 60 degrees. To form such bow structure on our machine, the rotary drive assembly 34 is thus adjusted, through appropriately setting index knob 100, so that retainer assembly 32 is caused to index 240 degrees for each cycle of feed assembly 31. That is, rotary drive assembly 34 will index 180 degrees to accommodate the face-to-back relation of the loop legs and 60 additional degrees to obtain the desired angle of loop leg intersection.

Clamp bar 171 is next positioned at a point adjacent the free end of adjustment arm 170, so that a relatively small loop will be formed. A pin 19 is then positioned in the retainer assembly 32 and the crank 111 rotated to bring the feed assembly against the retaining assembly thereby to impale the free end of the ribbon on the pin. Said crank is then rotated three complete turns to form loops 10, 11 and 12 in sequence. Clamp bar 171 is then moved toward the inner end of adjustment arm 170 so that it is positioned approximately mid-way along the length thereof. After this, the crank is rotated three additional complete turns, whereupon a second series or group of loops 13, 14 and 15 are formed respectively radially outward of and about loops 10, 11 and 12. Clamp bar 171 is again moved along arm 170, to a position adjacent the inner end of the latter, and loops 16, 17 and 18 are formed radially outward of and about loops 13, 14 and 15, respectively by rotating the crank three additional turns. The crank is then rotated through part of an additional turn to bring the feed assembly 31 to a position away from the bow, whereupon the length of ribbon between the feed assembly and the bow is severed. Ejector rod 55 is then pushed to eject the completed bow.

The five-point bow shown in Figure 15 is formed in a similar manner, except for the number of loops formed at each position of clamp bar 171 and the angle the loop retainer assembly indexes. Upon consideration of the geometric principles involved, it will be seen that a five-point bow can be formed where the legs of each loop intersect at an angle of either 36 or 108 degrees. Where there is a choice, the minimum angle of leg intersection preferably is selected. Firstly, the bulk of the loop thereby is reduced minimizing the interference between adjacent loops. Secondly, the sharper the angle of leg intersection, so long as the angle is not so acute that the legs and bight fold or crease, the more sharply pointed the conoidal loop bights appear. Thus, in fabricating the bow structure of Figure 15, index knob 100 is positioned so that loop retainer assembly 32 indexes 216 degrees (180 plus 36 degrees) for each cycle of the feed assembly. The machine is then operated as before. The smaller loop of family AA is first formed following which the corresponding loop in the family CC is formed. Then the loop in position EE, then the loop in position BB and finally the loop in position DD are formed in the order enumerated. Then the position of clamp bar 171 as altered and another series of loops formed, etc.

In fabricating the many various possible bows hereof having radially symmetric families of loops, and wherein the legs of each loop intersect in uncreased face-to-back relation with each loop leg being common with a leg of each loop immediately in succession therewith, we have found the following formula useful in determining a preferable index angle of loop retainer assembly 32.

$$D = \frac{360}{G} \times I$$

where G represents the number of families of loops to be symmetrically radially disposed, and has a value greater than two; I represents the smallest integer which will cause the value of D to exceed the 180 degrees necessary to accommodate the uncreased face-to-back relation of loop legs; and D represents the resulting desired degree of index.

Where the value of D is computed for a bow having an even number of "points," and said even number is divisible by two to yield an odd integer, said value will equal the value of D computed for a bow having a number of points corresponding with said odd integer. Thus, for example, the value of D for a six-point bow is 240 degrees—the same as the value of D for a three-point bow. In such case the bow having the smaller number of points preferentially is formed on our machine when it is operated in the normal manner, i.e., when loop retainer assembly 32 is indexed always in the same direction. However, the bow having the larger even number of symmetrically disposed points or families of symmetrically disposed points can be fashioned on our machine by modifying its operation slightly. This may be done by first forming one-half of the said even number of loops with loop retainer assembly indexing the computed angle D each time in the same direction. Then the remaining one-half of the loops are formed with said retainer assembly indexing through angle D each time in the direction opposite to the formation of the first one-half of the loops. Said retainer assembly can be oppositely indexed by removing chain 121 and rotating spindle 48 by hand. The reverse indexing causes the second half of the loops to be twisted oppositely from the first (each loop, however, being unidirectionally twisted) and thus to fall in place between loops of the first half. If additional series of loops of different size are to be added to form families of loops, each series is similarly applied.

The basis for the preferential formation of the "pointed" or star bows having the smaller number of loops, and the manner by which bows of twice the smaller number of loops can be formed will be apparent upon laying out, e.g., by generating on paper, the geometric configurations involved. It is to be noted, however, that as a rule we have found bows containing odd numbers of radially symmetrically disposed families of loops seem to be somewhat more uniformly shaped than those containing even numbers of families. Apparently this is because, in the latter type, legs of adjacent loops geometrically tend to lie on a common path. Since, this, of course, is not possible, some of the adjacent loops tend to deform.

The angle of index of loop retainer assembly 32 can also be purposely controlled so that families of symmetrically disposed loops, i.e., star bows, are not formed. This is accomplished simply by selecting an angle of index for the loop retainer assembly which is a significant variant from any values of D as computed in the above formula. For example a bow like that depicted in Figure 16, containing conoidal-shaped loops, is not composed of families of loops, although it is symmetrical in appearance. It can be fabricated on our machine by employing an index angle of about 200 degrees, and forming many loops of equal length.

The greater the angle of intersection between the legs of each loop the less pointed the bight of the loops appear. Generally, loops whose legs intersect at greater than about 120 degrees, particularly where the loops are long in comparison with ribbon width, and less than 180 degrees, do not appear to be of conoidal shape. (Legs coming together at 180 degrees, of course, do not intersect.) Hence, by indexing loop retainer assembly 32 from about 300 to less than 360 degrees, bows are formed whose loops appear tufted, resembling those of the pompon or puff bow.

Where loop retainer assembly 32 is indexed less than an angle in the order of 180 degrees (or slightly more depending on the relative length of loop to width of ribbon), insufficient twist is present for the entire loop to form uncreased. Significantly, however, particularly where the angle of index is substantially less than 180 degrees, it has been found that any creasing which results substantially always occurs in the legs of the loop, and then only immediately adjacent the bow center. Hence, the bight portions of bows composed of such loops remain smoothly arcuate and attractive, and the creased portions remain concealed at the bow center. The same surface of the ribbon is exposed outwardly in the loops. Such loops are not of conoidal shape, but rather resemble tufted loops. Accordingly, bows having the appearance of pompon or puff bows can be fashioned by forming many loops about the bow center, varying the lengths of loops or series of loops, if desired. Extremely attractive bows result, the bow of Figure 17 being exemplary of the type just described.

It is to be noted that loops formed on our machine wherein loop retainer assembly 32 indexes less than about 180 degrees for each loop, tend to form about the point end of pin 19, rather than about the head end as do our bows in which the loops have sufficient twist so as to remain uncreased. It may be undesirable for reasons of appearance to have the point exposed at the face surface of the bow. If so, after the bow is removed from the machine, the finally applied leg of the final loop formed can be folded back on itself, without removing it, and again impaled on the pin so as to conceal the point within said final loop.

From the foregoing description it will be apparent that many types and variations of bow structures can be formed on our novel machine all in accordance with the principles hereof. Multi-color bows can be fashioned, for example, by first forming a bow of small radial extent, followed by the formation of a larger bow of different color about the first bow. This can be accomplished simply by replacing the first supply of ribbon in the machine with ribbon of different color, and in effect, forming two bows on the same holding member. Other variations undoubtedly suggest themselves. Also, various modifications of our machine, embodying some or all of the novel features herein disclosed, can be envisioned.

In one such variation, the drive chain of the loop retainer drive assembly is not directly associated with a drive shaft at all, but instead is connected at one end thereof directly at a point along lever 134, which lever reciprocates about shaft 131, while still connected at its other end to the chain return spring. Thus upon reciprocation of said lever, the drive chain reciprocates therewith causing oscillation in the sprocket of the loop retainer drive assembly. The distance through which the chain reciprocates, with respect to that of the feed assembly contained on the lever, is adjustable by adjustably positioning the point along the lever at which said chain is affixed. Such variations, however, are comprehended; and we do not intend to be limited only to the specific embodiments herein described, but rather we intend to be limited only by our disclosure taken as a whole, including the appended claims.

We claim:

1. In a machine for making decorative bows from a continuous length of ribbon or strip material, rotatable loop retaining means and ribbon feed means, said retaining means being adapted to retain in fixed position relative thereto and rotatively therewith ribbon applied thereagainst, said feed means operating successively to apply portions of ribbon spaced along the continuous length thereof against said retaining means successively to form radiating loops of ribbon.

2. In a machine for making decorative bows from a continuous length of ribbon, rotatable loop retaining means and ribbon feed means, said retaining means being adapted to retain in fixed position relative thereto ribbon applied thereagainst, said feed means operating successively to apply portions of ribbon spaced along the continuous length thereof against said retaining means successively to form radiating loops of ribbon, said retaining means being caused to rotate between applications thereto of said ribbon portions.

3. In a machine for making decorative bows from a continuous length of ribbon, rotatable loop retaining means and a ribbon feed assembly, said retaining means being adapted to retain in fixed position relative thereto ribbon applied thereagainst; said feed assembly operating successively to apply portions of ribbon spaced along the continuous length thereof against said retaining means successively to form radiating loops of ribbon, and comprising a shuttle the free end of which moves into contact with and away from said loop retaining means as said feed assembly reciprocates, a guide member positioned normally to direct strip material carried by said feed assembly into interposition between said free end and said retaining means, and a one-way ribbon-engaging clutch preventing said feed assembly from slipping with respect to strip material carried thereby as said feed assembly moves toward said loop retaining means while readily permitting such slippage when said feed assembly moves in the direction away from said retaining means.

4. In a machine for making decorative bows from a continuous length of strip material, a rotatable loop retaining assembly and ribbon feed means; said retaining assembly comprising a spindle mounted for rotation about its axis, an annular sleeve slidably disposed on and about one end of said spindle coaxially therewith, said sleeve being movable from a forward position extending partially beyond said one end so as to define a cavity therein to a rearward position where said cavity is at least substantially reduced in depth, means urging said sleeve to its normal position, and means for removably retaining a central holding pin cantileverly from said one end of said spindle coaxially therewith with the pointed end of said pin exposed, said pin being positioned within said cavity when said sleeve is in its forward position; and said ribbon feed means operating successively to impale portions of ribbon spaced along the continuous length thereof about a pin disposed in position in said loop retaining assembly successively to form radiating loops of ribbon.

5. A machine for making decorative bows from a continuous length of ribbon comprising a shaft for receiving and rotatably supporting a supply roll of ribbon, rotatable loop retaining means and ribbon feed means, said retaining means being adapted to retain in fixed position relative thereto ribbon applied thereagainst; said feed means operating to withdraw a continuous length of ribbon from a supply roll mounted on said shaft and successively to apply portions of ribbon spaced along said continuous length against said retaining means successively to form radiating loops of ribbon, said retaining means being caused to rotate between each application of a ribbon portion thereto, said loops thereby being twisted as they are formed and being disposed on different radii.

6. A machine for making decorative bows from a continuous length of ribbon comprising: a base, a mandrel block positioned on said base, loop retaining means positioned for rotation about its axis in said block, a standard extending upwardly from said base having a shaft at its upper end adapted to receive and rotatably support a supply roll of ribbon, a lever depending from said shaft and being movable toward and away from said retaining means, and ribbon feed means disposed on the free end of said lever in a position coaxially with said retaining means when said feed means is moved into contact with said retaining means, and a ribbon guide post extending upwardly from said base at a position on the side of said standard away from said block; said retaining means being adapted to retain in fixed position relative thereto ribbon applied thereagainst, said feed means operating to withdraw from a supply roll mounted on said shaft a continuous length of ribbon extending about said post to said feed means and successively to apply portions of ribbon spaced along said continuous length against said retaining means successively to form radiating loops of ribbon, said retaining means further being caused to rotate between each application of ribbon portions thereto, said loops as they are formed thereby being twisted and being disposed on different radii.

7. A machine for making decorative bows from a continuous length of ribbon comprising: a base, a mandrel block positioned on said base, loop retaining means positioned for rotation about its axis in said block, a standard extending upwardly from said base having a shaft at its upper end adapted to receive and rotatably support a supply roll of ribbon, a lever depending from said shaft and being movable toward and away from said retaining means, and ribbon feed means disposed on the free end of said lever in a position coaxially with said retaining means when said feed means is moved into contact with said retaining means, mechanical means connecting said lever and said retaining means for intermittently unidirectionally rotating said retaining means as said lever reciprocates, and a ribbon guide post extending upwardly from said base at a position on the side of said standard away from said block; said retaining means being adapted to retain in fixed position relative thereto ribbon applied thereagainst, said feed means operating to withdraw from a supply roll mounted on said shaft a continuous length of ribbon extending about said post to said feed means and successively to apply portions of ribbon spaced along said continuous length against said retaining means successively to form radiating loops of ribbon, the rotation of said retaining means causing said loops as they are formed each to be unidirectionally twisted and said loops to be disposed on different radii.

8. A machine for making decorative bows from a continuous length of ribbon comprising: a base, a mandrel block positioned on said base, loop retaining means positioned for rotation about its axis in said block, a standard extending upwardly from said base having a shaft at its upper end adapted to receive and rotatably support a supply roll of ribbon, a lever depending from said shaft and being movable toward and away from said retaining means, and ribbon feed means disposed on the free end of said lever in a position coaxially with said retaining means when said feed means is moved into contact with said retaining means, a drive shaft also rotatably disposed in said block, a feed drive assembly causing said lever adjustably to reciprocate with said feed means moving toward, against and away from said retaining means upon rotation of said drive shaft, a loop retainer drive assembly causing intermittent unidirectional rotation in said loop retaining means upon rotation of said drive shaft, and a ribbon guide post extending upwardly from said base at a position on the side of said standard away from said block; said retaining means being adapted to retain in fixed position relative thereto ribbon applied thereagainst, said feed means operating to withdraw from a supply roll mounted on said shaft a continuous length of ribbon extending about said post to said feed means and successively to apply portions of ribbon spaced along said continuous length against said retaining means successively to form radiating loops of ribbon, the rotation of said retaining means causing said loops as they are formed each to be unidirectionally twisted and said loops to be disposed on different radii.

9. The machine of claim 8, wherein said said feed drive assembly comprises a disc fixed coaxially with respect to said drive shaft, an arcuate arm extending from the upper end of said lever on an arc whose radius extends from the center of said disc when said feed means is in a position against said retaining means, and a connecting rod assembly rotatably connected eccentrically to said disc at one end and slidably connected to said arm at its other end.

10. The machine of claim 8, wherein said loop retainer drive assembly comprises a one-way clutch, including a sprocket, positioned on said retaining means, said clutch causing said retaining means intermittently unidirectionally to rotate upon oscillation of said sprocket, and means associated with said drive shaft and said sprocket for converting rotational motion in said drive shaft into an oscillating motion in said sprocket.

11. The machine of claim 8, wherein said loop retainer drive assembly comprises a one-way clutch, including a sprocket, positioned on said retaining means, said clutch causing said retaining means intermittently unidirectionally to rotate upon oscillation of said sprocket, a disc fixed coaxially with respect to said drive shaft, a first pulley eccentrically positioned on said disc, an index arm adjustably positioned for movement about said disc in an arc generally on one side of said disc, an idler pulley fixedly positioned generally on the opposite side of said disc from said index arm in alignment with said first pulley, and a flexible drive chain affixed at one end thereof to said index arm in alignment with said pulleys and extending on one side of said first pulley, about the correspondingly opposite side of said second pulley and about said sprocket in engagement therewith, said chain terminating at its other end in chain return means for normally maintaining tension in said chain.

12. In combination with a reciprocally movable lever depending from a shaft about which said lever reciprocates, a rotatable drive shaft and a drive assembly for causing said lever adjustably to reciprocate while the limit of motion of said lever in one direction remains the same, said feed drive assembly comprising a disc fixed coaxially with respect to said drive shaft, an arcuate arm extending from the upper end of said lever on an arc whose radius extends from the center of said disc when said lever is in the extreme desired position in said one direction, and a connecting rod assembly rotatably connected eccentrically to said disc at one end and slidably connected to said arm at its other end.

13. In combination with a body mounted for rotation about an axis, a rotatable drive shaft and a drive assembly for causing intermittent unidirectional rotation in said body upon rotation of said drive shaft, said drive assembly comprising a one-way clutch including a sprocket positioned on said body, said clutch causing said body intermittently unidirectionally to rotate upon oscillation of said sprocket, a disc fixed coaxially with respect to said drive shaft, a first pulley eccentrically positioned on said disc, an index arm adjustably positioned for movement about said disc in an arc generally on one side of said disc, an idler pulley fixedly positioned generally on the opposite side of said disc from said index arm in alignment with said first pulley, and a flexible drive chain affixed at one end thereof to said index arm in alignment with said pulleys and extending on one side of said first pulley, about the correspondingly opposite side of said second pulley and about said sprocket in engagement therewith, said chain terminating at its other end in chain return means for normally maintaining tension in said chain.

14. In fashioning a decorative bow from a continuous length of strip material, the steps comprising: grasping a length of strip material adjacent its free end and at a point spaced therefrom, unidirectionally twisting the portion of ribbon between the points where grasped and bringing the strip material at said free end and at said spaced point together in uncreased intersecting face-to-back relation to form a first loop having a first leg adjacent said free end, a second leg adjacent said space point and a smoothly arcuate bight; fastening the legs of said loop together at their point of intersection; grasping said strip material at said point of intersection and at a third point along said length spaced from said point of intersection, twisting the strip material between said point of intersection and said third point unidirectionally in the same relative direction as before and bringing the strip material together at said point of intersection and said third point together at said point of intersection in intersecting face-to-back relation to form a second loop having a first leg which is common with and a continuation of the second leg of said first loop, a second leg adjacent said third point and a smoothly arcuate bight; and fastening said loops together at said points of intersection.

15. In fashioning a decorative bow from a continuous length of strip material, the steps comprising: grasping a length of strip material adjacent its free end and at a point spaced therefrom, unidirectionally twisting the portion of ribbon between the points where grasped and bringing the strip material at said free end and at said spaced point together in uncreased intersecting face-to-back relation to form a first loop of generally conoidal shape having a first leg adjacent said free end, a second leg adjacent said space point and a smoothly arcuate bight; impaling said legs on a central holding pin at the point of intersection of said legs; grasping said strip material at said point of intersection and at a third point along said length spaced from said point of intersection, twisting the strip material between said point of intersection and said third point unidirectionally in the same relative direction as before and bringing the strip material together at said point of intersection and said third point together at said point of intersection in intersecting face-to-back relation to form a second loop of generally conoidal shape having a first leg which is common with and a continuation of the second leg of said first loop, a second leg adjacent said third point and a smoothly arcuate bight; and impaling the second leg of said second loop on said pin at said third point.

16. In a machine for making decorative bows from a continuous length of ribbon, rotatable loop retaining means and a ribbon feed assembly, said retaining means being adapted to retain in fixed position relative thereto ribbon applied thereagainst; said feed assembly operating successively to apply portions of ribbon spaced along the continuous length thereof against said retaining means successively to form radiating loops of ribbon, and comprising a shuttle the free end of which moves into contact with and away from said loop retaining means as said feed assembly reciprocates, a guide member positioned normally to direct strip material carried by said feed assembly into interposition between said free end and said retaining means, and a one-way ribbon-engaging clutch preventing said feed assembly from slipping with respect to strip material carried thereby as said feed assembly moves toward said loop retaining means while readily permitting such slippage when said feed assembly moves in the direction away from said retaining means; said retaining means being caused to rotate between applications thereto of said ribbon portions.

17. A machine for making decorative bows from a continuous length of ribbon comprising a shaft for receiving and rotatably supporting a supply roll of ribbon, rotatable loop retaining means and ribbon feed means, said retaining means being adapted to retain in fixed position relative thereto and rotatively therewith ribbon applied thereagainst; said feed means operating to withdraw a continuous length of ribbon from a supply roll mounted on said shaft and successively to apply portions of ribbon spaced along said continuous length against said retaining means successively to form radiating loops of ribbon.

18. A machine for making decorative bows from a continuous length of ribbon comprising: a base, a mandrel block positioned on said base, loop retaining means positioned for rotation about its axis in said block a standard extending upwardly from said base having a shaft at its upper end adapted to receive and rotatably support a supply roll of ribbon, a lever depending from said shaft and being movable toward and away from said retaining means, and ribbon feed means disposed on the free end of said lever in a position coaxially with said retaining means when said feed means is moved into contact with said retaining means, means for intermittently unidirectionally rotating said retaining means as said lever reciprocates, and a ribbon guide post extending upwardly from said base at a position on the side of said standard away from said block; said retaining means being adapted to retain in fixed position relative thereto ribbon applied thereagainst, said feed means operating to withdraw from a supply roll mounted on said shaft a continuous length of ribbon extending about said post to said feed means and successively to apply portions of ribbon spaced along said continuous length against said retaining means successively to form radiating loops of ribbon, the rotation of said retaining means causing said loops as they are formed each to be unidirectionally twisted and said loops to be disposed on different radii.

19. The machine of claim 8, wherein said loop retainer drive assembly comprising a one-way clutch, including a driven wheel, positioned on said body, said clutch causing said body to intermittently unidirectionally to rotate upon oscillation of said wheel, an eccentric affixed to said drive shaft, a flexible drive member extending about said wheel in engagement therewith in a path extending also about said eccentric, said drive member being fixed at the end thereof extending about said eccentric and terminating at its other end in extensible return means normally maintaining tension in said flexible member, said eccentric upon rotation of said drive shaft alternately increasing and decreasing the length of said flexible member between its fixed end and said wheel with consequent reciprocation of said flexible member about said wheel, thereby causing oscillation of said wheel.

20. In combination with a body mounted for rotation, a rotatable drive shaft and a drive assembly for causing intermittent unidirectional rotation in said body upon rotation of said drive shaft, said drive assembly comprising a one-way clutch, including a driven wheel, positioned on said body, said clutch causing said body intermittently unidirectionally to rotate upon oscillation of said driven wheel, an eccentric affixed to said drive shaft, a flexible drive member extending about said wheel in engagement therewith in a path extending also about said eccentric, said drive member being fixed at the end thereof extending about said eccentric and terminating at its other end in extensible return means normally maintaining tension in said drive member, said eccentric upon rotation of said drive shaft alternately increasing and decreasing the length of said flexible member between its fixed end and said wheel with consequent reciprocation of said flexible member about said wheel, thereby causing oscillation of said wheel.

References Cited in the file of this patent

UNITED STATES PATENTS

| | | |
|---|---|---|
| 2,312,645 | Huber | Mar. 2, 1943 |
| 2,528,622 | Teemsma | Nov. 7, 1950 |
| 2,542,222 | Welch | Feb. 20, 1951 |
| 2,563,678 | Gates | Aug. 7, 1951 |
| 2,841,905 | Wanchek | July 8, 1958 |
| 2,884,169 | Sperry | Apr. 28, 1959 |